US006822854B2

(12) United States Patent
Te Maarssen et al.

(10) Patent No.: US 6,822,854 B2
(45) Date of Patent: Nov. 23, 2004

(54) KEYBOARD

(76) Inventors: Johannes Wilhelmus Paulus Te Maarssen, Marhulzen 1, Groenlo (NL), 7141; Vineet Shankar, 119, Sector 36-A, Chandigarh (IN)

( * ) Notice: Subject to any disclaimer, the term of this patent is extended or adjusted under 35 U.S.C. 154(b) by 64 days.

(21) Appl. No.: 10/197,196

(22) Filed: Jul. 17, 2002

(65) Prior Publication Data

US 2003/0026066 A1 Feb. 6, 2003

(30) Foreign Application Priority Data

Jul. 19, 2001 (NL) .............................................. 1018584

(51) Int. Cl.⁷ ................................................. G06F 1/16
(52) U.S. Cl. ....................... 361/680; 361/683; 400/489; 248/118
(58) Field of Search ................................. 361/683, 680; 345/168, 169; 341/20, 22, 21, 27; 600/21; 248/118, 118.5, 918, 917; 400/472, 486, 489, 482, 492, 485, 715; 434/230–233; 601/40; 602/20

(56) References Cited

U.S. PATENT DOCUMENTS

| | | | | |
|---|---|---|---|---|
| 3,990,565 A | * | 11/1976 | Felton et al. ................. 400/70 |
| 4,661,005 A | * | 4/1987 | Lahr ......................... 400/489 |
| 5,004,196 A | * | 4/1991 | Gross ...................... 248/118.3 |
| 5,067,834 A | * | 11/1991 | Szmanda et al. ........... 400/489 |
| 5,122,786 A | * | 6/1992 | Rader ......................... 345/168 |
| 5,135,190 A | | 8/1992 | Wilson .................... 248/118.1 |
| 5,137,384 A | * | 8/1992 | Spencer et al. ............. 400/489 |
| 5,160,919 A | | 11/1992 | Mohler et al. .............. 340/711 |
| 5,161,760 A | * | 11/1992 | Terbrack .................... 248/118 |
| 5,217,311 A | | 6/1993 | Freedman ................... 400/482 |
| 5,342,005 A | * | 8/1994 | Szmanda et al. ........... 248/118 |
| 5,410,333 A | * | 4/1995 | Conway ..................... 345/169 |
| 5,416,498 A | | 5/1995 | Grant ......................... 345/168 |
| 5,426,449 A | * | 6/1995 | Danziger .................... 345/168 |
| 5,612,718 A | * | 3/1997 | Bryan ........................ 345/168 |
| 5,667,320 A | | 9/1997 | Ambrose et al. ........... 400/472 |
| 5,876,362 A | * | 3/1999 | Root ........................... 602/21 |
| 6,022,156 A | * | 2/2000 | Blish ......................... 400/472 |
| 6,088,022 A | | 7/2000 | Rakoski ..................... 345/168 |
| 6,132,118 A | * | 10/2000 | Grezeszak ................. 400/489 |
| 6,454,224 B1 | * | 9/2002 | Nogueira ................. 248/118.5 |

FOREIGN PATENT DOCUMENTS

| | | | | |
|---|---|---|---|---|
| DE | 29804683 U1 | * | 5/1998 | ............. G06F/3/02 |
| DE | 29804683 U1 | | 6/1998 | |
| WO | WO95/26661 | | 10/1995 | |

OTHER PUBLICATIONS

International Search Report for Netherlands Application No. 1018584.
J. Adler et al., *Typing Without Keys*, Newsweek (Dec. 7, 1992).
O. Kneppers, *Apple Brengt Kleur in de Lijn* (Untranslated), Mac World (Feb. 1, 1993).

* cited by examiner

*Primary Examiner*—Michael Datskovsky
(74) *Attorney, Agent, or Firm*—Michael Cesarano; Akerman Senterfitt

(57) ABSTRACT

A keyboard comprising a left and a right keyboard portion which are intended to be operated on a respective operation side by a left hand and right hand, respectively, wherein the operation side (7, 8) of each keyboard portion (5, 6) includes an angle in the range of about 60–150 degrees with a horizontal plane, the keyboard (1) being provided with left and right supporting means (13, 14; 15) for supporting the left and right hand, respectively, during operation of the respective keyboard portion (5, 6), the supporting means (13, 14; 15) being arranged to permit during use a substantially horizontal displacement of the hands supported thereon relative to the respective keyboard portion (5, 6).

20 Claims, 4 Drawing Sheets

KEYBOARD

TECHNICAL FIELD

This invention relates to a keyboard, comprising a left and a right keyboard portion which are intended to be operated on a respective operation side by a left hand and a right hand, respectively.

BACKGROUND ART

Such a keyboard is known from practice and is usually connected to a computer to operate the computer. To that end, each keyboard portion of the keyboard is provided with keys which can be operated on the operation side of the keyboard portion by the user, at least by striking the keys.

A disadvantage of the known keyboard is that many users after long-term use of the keyboard sustain RSI (Repetitive Strain Injury), also known as Cumulative Trauma Disorder (CTD), Carpal Tunnel Syndrome (CTS), Musculoskeletal Disorder (MSD), Occupational Overuse Syndrome (OOS), Work Related Upper Limb Disorder (WRULD), which may become manifest as muscular pain in arm, back and/or neck, numb arms and/or numb fingers or the like. This may lead to a temporarily reduced productivity of the user. In some cases, due to RSI, the user is even wholly incapable of using the keyboard in a normal manner anymore. These adverse consequences of RSI can afflict, for instance, office workers who are to make long-term use of keyboards during computer activities, thus leading to financial damage at the offices and companies where these workers are employed.

SUMMARY OF THE INVENTION

The object of the present invention is to provide a keyboard by virtue of which RSI phenomena resulting from the use of the keyboard cannot occur, or at least occur to a lesser extent.

To that end, the keyboard according to the invention is characterized in that the operation side of each keyboard portion includes an angle in the range of about 60–150 degrees with a horizontal plane, the keyboard being provided with left and right supporting means for supporting at least the left and right hand and/or forearm, respectively, during operation of the respective keyboard portion, the supporting means being arranged to permit during use a substantially horizontal displacement of the hands and/or forearms supported thereon, relative to the respective keyboard portion.

Surprisingly, it has been found that the occurrence of RSI can be controlled well with this keyboard. As a result, the productivity of a user of the keyboard can remain at a desired high level. During operation of this keyboard, the user can hold his hands and associated arms in a posture whereby associated forearms are in a natural, preferably substantially unrotated position. This natural, substantially unrotated position of the user's forearms involves substantially no supination and no pronation of the forearms, the muscles intended for supination and pronation being substantially relaxed. In addition, the user can keep his hands and associated arms in a posture whereby associated forearms are in a position such that his thumbs face away from each other, with the palms of the hands turned slightly upwards. The user can keep his forearms in this position during use of the keyboard, in that the operation side of each keyboard portion includes an angle in the range of 60–150 degrees with a horizontal plane. During operation of the keyboard, the user's hands are supported by the supporting means. As a result, relatively little effort is required from the user to keep at least his hands in desired positions on the operation side of the keyboard portions. While his hands are supported by the supporting means, the user can move his hands in substantially horizontal direction, which considerably facilitates, for instance, moving his fingers to the keys to be operated.

According to a preferred embodiment of the invention, the left and right supporting means are provided with a left and right supporting part, respectively, for supporting at least a respective hand and/or forearm, with each supporting part being arranged so as to be movable substantially in horizontal direction.

This is an embodiment of the supporting means that is simple and inexpensive to realize. These supporting means can effect a proper, firm support of the hands, whilst each hand is movable in a substantially horizontal direction. The supporting means can be arranged, for instance, to support the ball of a thumb, a part of a thumb, a part of the back of a hand, a side of the palm of a hand, such as a side thereof remote from the thumb, or a combination of these or other parts of the hand. The supporting means may be loosely placeable adjacent the keyboard. In addition, the left and right supporting means may be provided with a respective connecting part to couple the respective supporting part to the keyboard. Each connecting part may be, for instance, at least pivotally, slidably or telescopically movably connected to the keyboard. Further, the supporting means may be arranged such that the supporting part undergoes a slightly downwardly directed displacement from a vertical equilibrium position when the user exerts a relatively great pressure on the supporting part, which pressure exceeds a particular limit value. As a result, the user can reach, for instance, certain keys, to be used infrequently and hence situated at the bottom, that are not accessible from the vertical equilibrium position of the supporting part.

According to a further elaboration of the invention, each supporting part is suspended from the keyboard by means of an associated connecting part.

This can be effected with relatively simple means, for instance with supporting means designed in the form of a sling. The suspended supporting part offers good support of the hand. Moreover, in this way, the connecting part and supporting part are subject to wear to a relatively limited extent during use. Therefore, this is a very durable elaboration of the supporting means. Supporting means in the form of a sling have as an additional advantage that they can be a proper fit to the hand, and possibly forearm, and thus can offer a natural, ergonomic support.

According to a preferred embodiment, the keyboard is provided with means for generating an electronic signal that depends on a movement and/or a position of at least one supporting part relative to the keyboard.

The electronic signal can be used advantageously in different ways. For instance, the signal can be used to control a computer at least partly. To that end, the invention provides an assembly of a computer and a keyboard, the keyboard being arranged to transmit the electronic signal to the computer, and the computer being arranged to be controlled at least partly under the influence of that signal, in particular such that under the influence of the electronic signal a position of a cursor and/or pointer generated on a display by the computer can be controlled.

According to a further elaboration of the invention, the operation sides mentioned extend substantially in vertical direction.

As a result, the user can keep his forearms in a very favorable position, with the hands extending likewise in a substantially vertical direction. The operation sides can substantially face away from each other. As a result, the user can place his arms and hands in a very natural position during use of the keyboard, with palms of the user's hands more or less facing each other.

According to a preferred embodiment, the keyboard is so designed that the direction in which each of the operation sides extends is adjustable.

In this way, the direction in which each of the operation sides extends can be adjusted, for instance, to the posture and/or the wishes of an individual user. To that end, for instance, each operation side may be bent or may have been bent into a parabolic, cylindrical, spherical or differently curved shape, in a flat form or a combination of these or other suitable shapes. As a consequence, moreover, different users can make use of the keyboard, with each user in each case setting the operation sides in the direction most suited to him, so as to prevent or reduce RSI. Preferably, the keyboard is at least partly made of flexible material, such that the keyboard can be bent to change the direction in which each of the operation sides extends. As a result, the operation sides can be simply brought into a desired direction of extension.

According to a highly advantageous elaboration, each keyboard portion is provided with a verification side, remote from the associated operation side, with each keyboard portion being so designed that operation of the keyboard portion is visually verifiable on the verification side.

This is advantageous especially when the keyboard is positioned such that the operation side of each keyboard portion faces away from the user, or at least is not directly visible from a user position. In that case, during use, the user can see on the verification side facing him, or at least visible to him, which keys he is operating or will operate. To that end, the keyboard may be, for instance, of transparent design, and, in particular, contain transparent material and/or be provided with light-transmitting recesses. In addition, each keyboard portion can be provided with pressable keys, which keys extend from the respective operation side to the respective verification side, the keys being provided with corresponding key symbols on the verification side. Also, the keyboard may be provided with a picture facing a user, on which the layout of the keys is visible. For this purpose, other means can also be used, such as, for instance, readable electronics provided on the verification sides, such as LEDs, a number of LCD screens or the like, visualizing the operation of the keyboard. Further, it is possible with a camera to visualize the operation sides of the keyboard on a display, for verification of the operation.

According to a further elaboration of the invention, the keyboard is provided with mirrors which are so positioned that the user, from a user position, can see the operation sides of the keyboard portions via the mirrors.

The advantage achieved in a simple manner with these mirrors is that the user can see the operation sides of the keyboard, which is advantageous especially when these face away from him, thus allowing him to verify the operation of the keyboard from the user position. The mirrors, for instance, may be fixedly or detachably connected to the keyboard or may not be connected to the keyboard.

Further, the invention provides a data carrier provided with computer data which, when loaded into a computer, render such computer suitable to be operated by a keyboard according to any one of claims 1–21.

With this data carrier, in a simple manner, a computer can be rendered suitable to be used with the keyboard according to the invention. The data carrier may further be provided, for instance, with instructions-for-use of the keyboard, to be read on the computer by a user, with information to be read with the computer, concerning RSI control with the keyboard, or the like.

Further advantageous elaborations of the invention are described in the subclaims.

BRIEF DESCRIPTION OF THE DRAWINGS

The invention will be further described with reference to the following drawings in which.

DETAILED DESCRIPTION OF THE INVENTION

Figure 1:
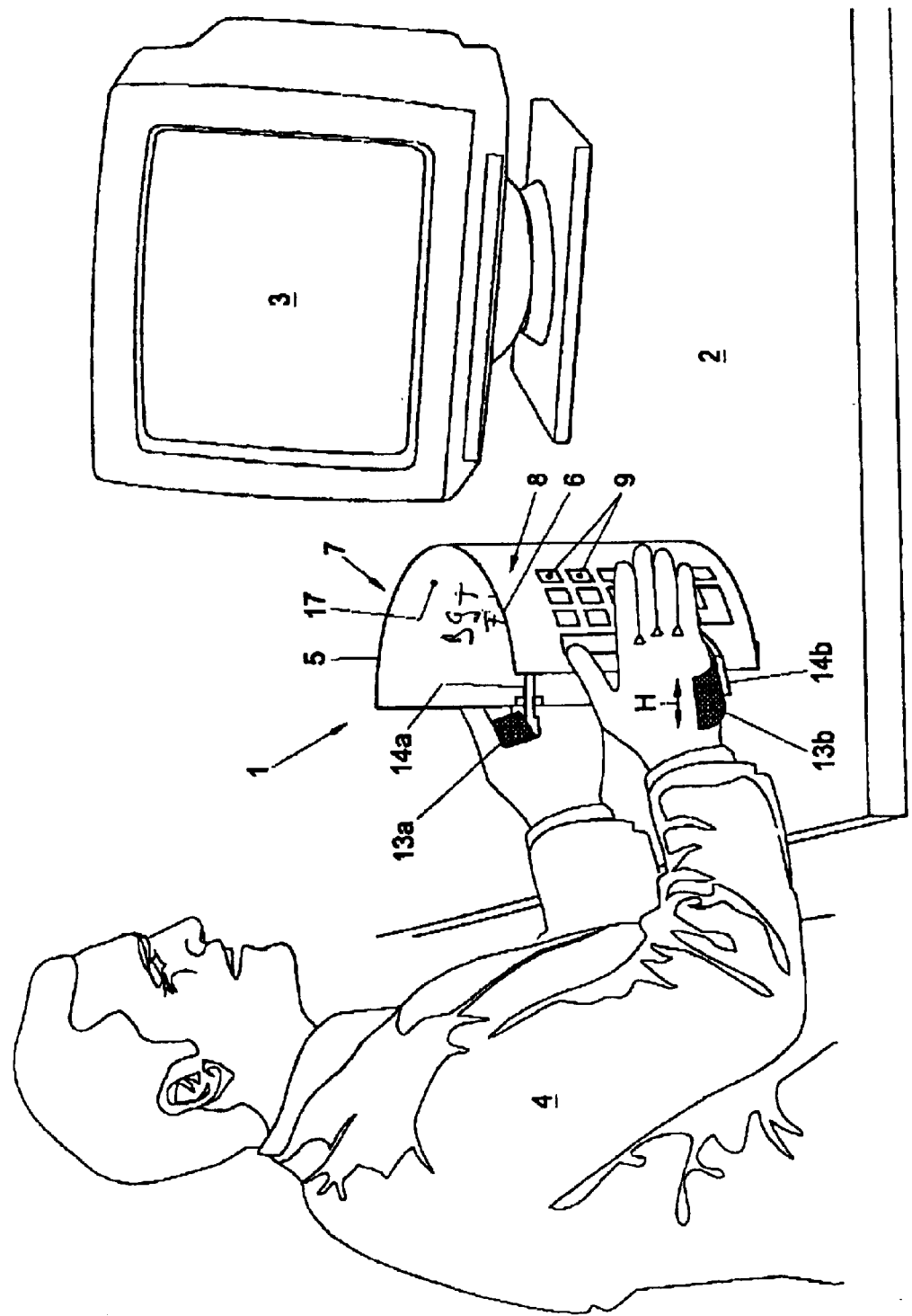
FIG. 1 shows a first exemplary embodiment of the invention.

FIG. 1 schematically shows a perspective view of a first exemplary embodiment of a keyboard 1 according to the invention. The keyboard 1 is disposed on a table 2 between a display 3 and a user 4. The keyboard 1 is provided with a left keyboard portion 5 and a right keyboard portion 6. On an operation side 7 and 8 of each keyboard portion 5 and 6, respectively, keys 9 are situated which can be operated by the user 4 with his left hand and right hand, respectively. Each keyboard portion 5, 6 is of substantially cylinder segment-shaped design, which is an ergonomic embodiment thereof. The cylinder segment shape of each keyboard portion 5, 6 is moreover advantageous in view of the relatively limited amount of material required to manufacture such a keyboard portion 5, 6.

As shown in the figure, the operation sides 7, 8 of the keyboard portions 5, 6 extend substantially in vertical direction. As a result, the user 4 can keep his hands and associated arms, shoulder and neck in a posture whereby associated forearms are in a natural, substantially unrotated position. Further, the keyboard 1 is provided with left supporting means 13a, 14a and right supporting means 13b, 14b, for supporting the left hand and right hand, respectively, during operation of the respective keyboard portion 5, 6. The supporting means are provided with hand-supporting parts 13a, 13b, which are coupled to a keyboard portion 5, 6 of the keyboard 1 through connecting parts 14a, 14b, respectively, such that each supporting part 13 is movable substantially in horizontal direction. Therefore, these supporting means permit a horizontal displacement of the hands supported thereby, relative to the respective keyboard portion 5, 6. This displacement is schematically represented by an arrow H, for at least the right hand drawn. For the purpose of this displacement, each connecting part 14 can be connected to the keyboard in different ways, for instance pivotally, slidably and/or telescopically movably. Each supporting part 13 can be made of ergonomic design, at least be shaped to conform to the part of a hand to be supported.

With the keyboard 1, good results are obtained in controlling and preventing RSI complaints. The user 4 can keep his forearms and hands in a natural posture during the operation of the keys 9 of the keyboard 1. In doing so, he can move his supported hands in horizontal direction, so that he can reach all keys 9 with only little effort.

As is represented in FIG. 1, from his position, the user 4 basically cannot observe the keyboard operation sides 7, 8 facing away from him. Therefore, it is advantageous when each keyboard portion 5, 6 is provided with a verification side 17, facing away from the associated operation side 7, 8, on which verification side 17 operation of the keyboard portion 5, 6 is visually verifiable. This simplifies operation of the keyboard 1, because the user 4 in this way can still observe whether he is correctly operating the keyboard 1, at least will operate and/or is operating the desired keys 9. To that end, the keyboard portions 5, 6 can be made, for instance, of partly transparent design, which is not represented in the drawing, for simplicity. Further, a picture of the key functions and with associated key positions can be provided on a side of the keyboard 1 facing the user 4.

Figure 2:
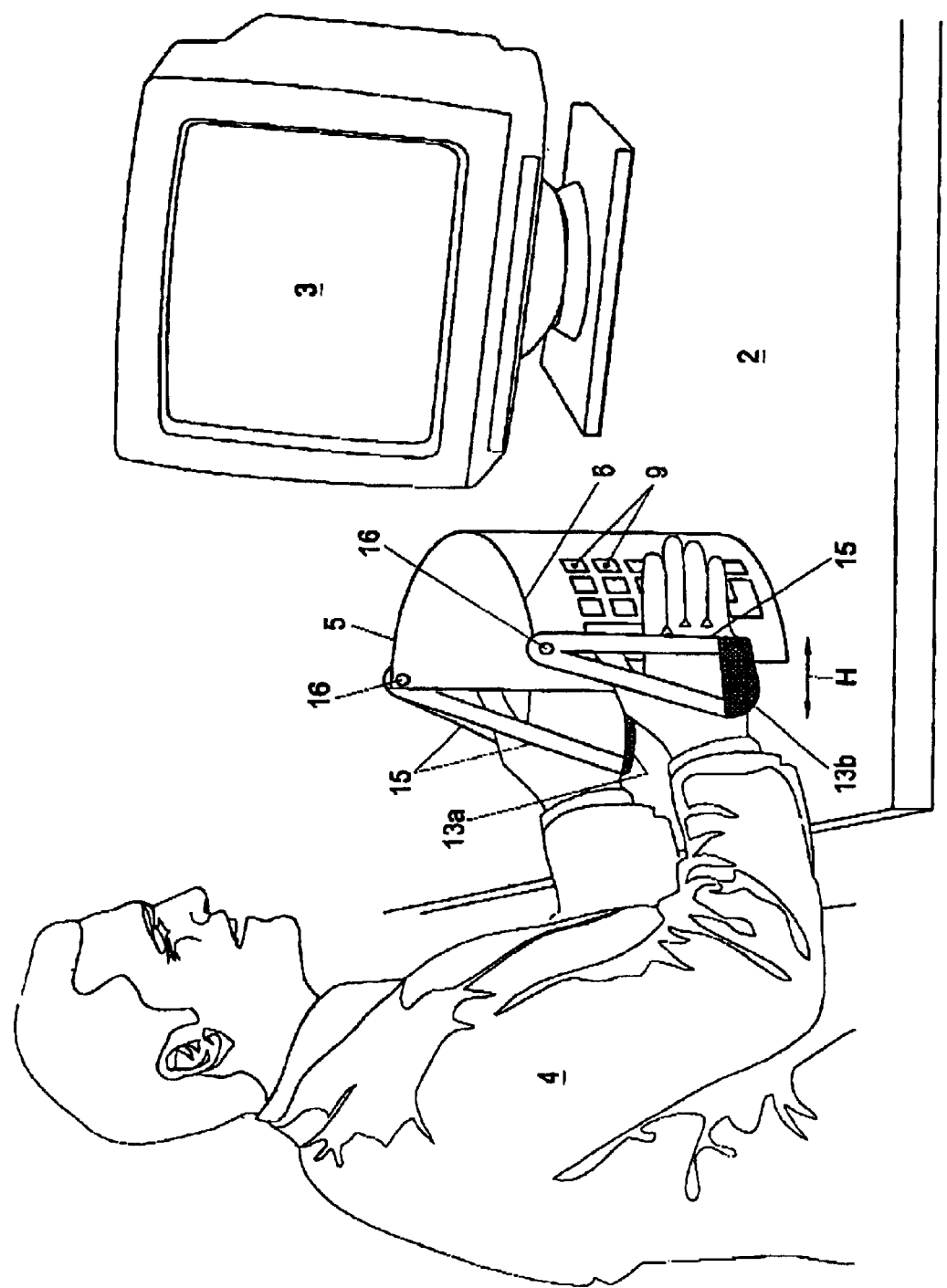
FIG. 2 shows a second exemplary embodiment of the invention.

FIG. 2 shows a second exemplary embodiment of the keyboard, where the left and right keyboard portions 5, 6 are in one piece. The supporting means of this exemplary embodiment are designed in the form of a sling. The supporting means are provided with supporting parts 13 which are suspended from suspension points 16 of the respective keyboard portions 5, 6 by straps 15. This simple embodiment of the supporting means likewise enables the user 4 to move his hands in a substantially horizontal direction, at least over a defined distance, to reach the keys 9.

It will be understood that the invention is not limited to the exemplary embodiments described but that various modifications are possible within the framework of the invention.

Figure 3:
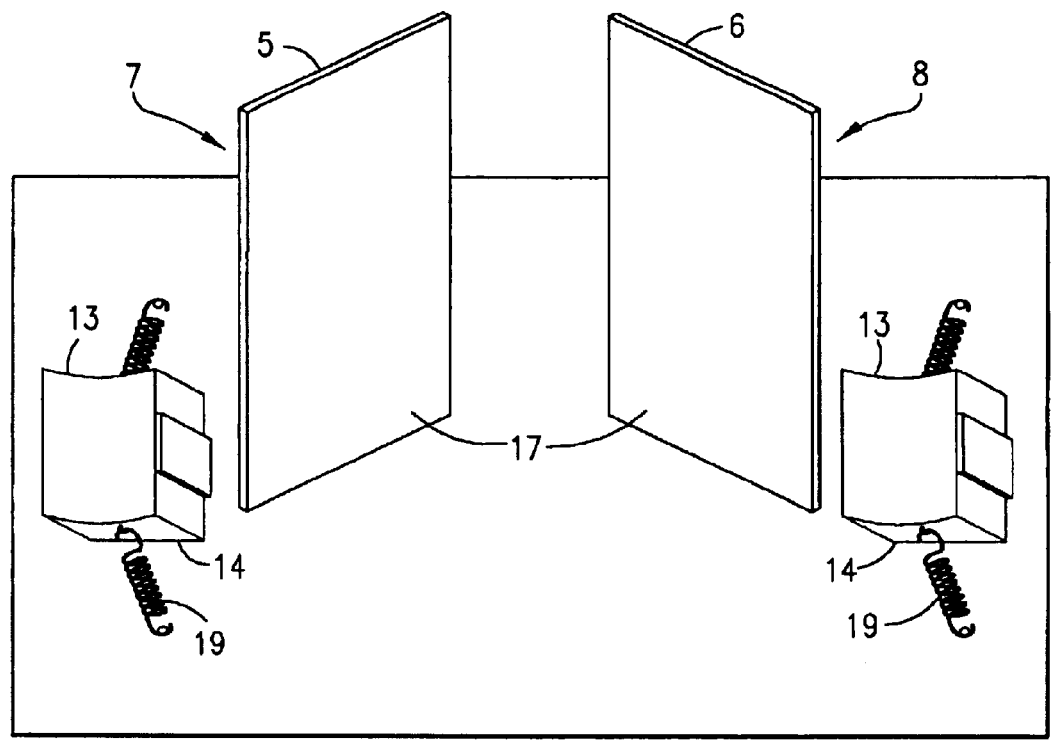
FIG. 3 shows a perspective view of the keyboard of this invention with detatched components.
Figure 4A:
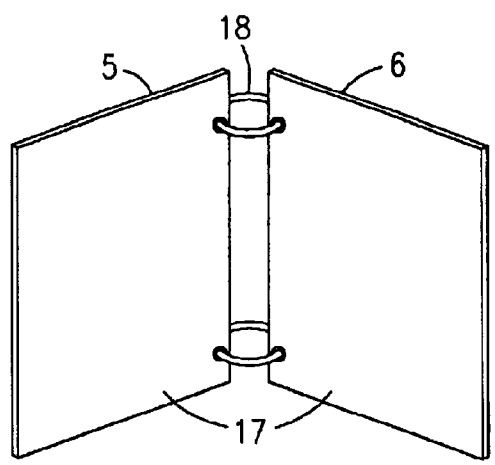
FIGS. 4a and 4b show an embodiment of the keyboard of this invention having segmented, detatchable components.
Figure 4B:
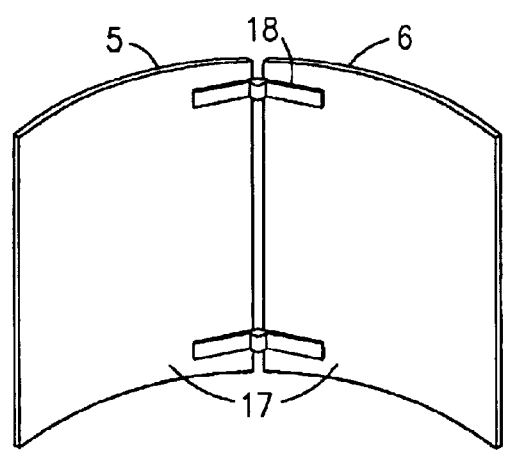
Figure 7A:
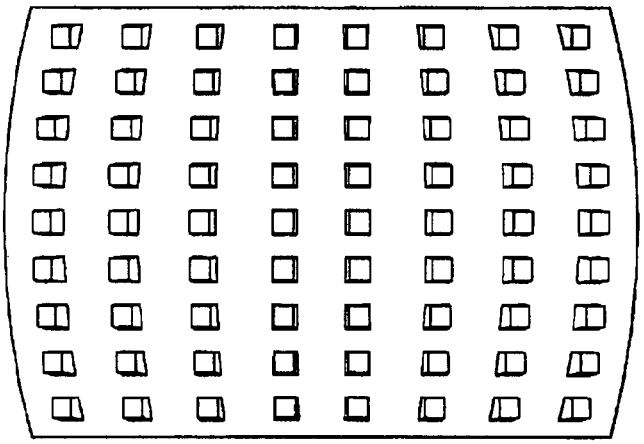
FIGS. 7a and 7b depict the keyboard of this invention as a truncated portion of the surface of a sphere.
Figure 7B:
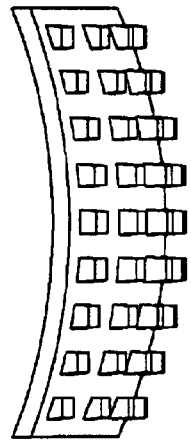

As shown in FIG. 3, the keyboard portions 5, 6 can be positioned relative to each other in different ways, for instance next to each other, opposite each other or at a particular angle relative to each other. The keyboard portions 5, 6 may be fixedly or detachably connected to each other, or may not be connected to each other. In the latter case, the keyboard portions may be disposed at a mutual distance, for instance at such a distance as to allow the user 4 to keep his arms and hands in a desired natural position relative to the respective operation sides 7, 8. Further, as depicted in FIGS. 4a and 4b, the left and right keyboard portion may, for instance, be pivotally connected to each other, using a suitable connector 18, so that the keyboard portions can be simply positioned in a desired relative position. The keyboard portions 5, 6 may take the shape of a plane, as in FIGS. 3 and 4a, or maybe curved to form a curved segment of a cylinder, as in FIG. 4b, or may form a portion of a spherical surface, as shown in FIGS. 7a and 7b.

Depending on the desired posture of the user 4, the operation sides 7, 8 can extend in different directions, for instance in a substantially vertical direction, or in a direction with these sides 7, 8 facing partly upwards or partly downwards. In the latter case, the user 4 can operate the keyboard 1 while the palms of his hands face partly upwards, which may be a highly favorable posture for some users 4 to prevent or reduce the occurrence of RSI.

Further, as shown in FIG. 3, the supporting means 13 may be arranged to support—besides the hands—wrists, forearms and/or parts thereof, which may further push back the occurrence of RSI phenomena.

Figure 6:
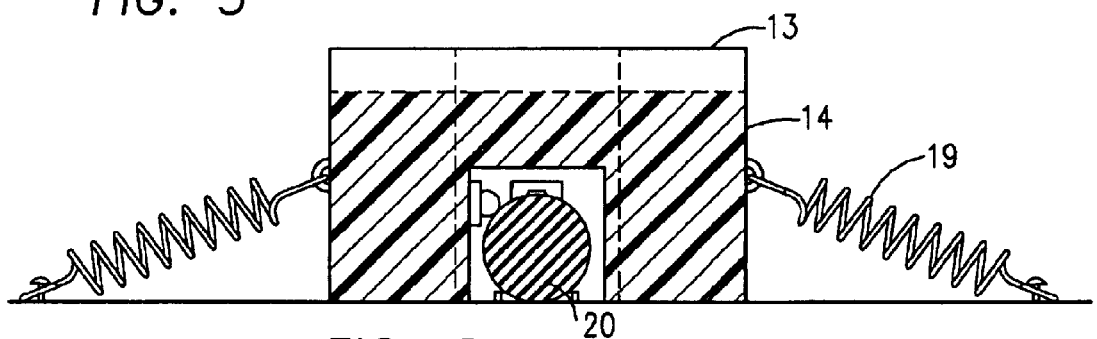
FIG. 6 is a sectional elevational view showing movement detection means embedded within a supporting part.

Further, the supporting means 13 may each be provided with spring means 19 arranged to exert a spring force on the respective connecting part 14 after the connecting part has been displaced relative to the keyboard 5, 6 from a starting position, which spring force is directed against that displacement. Thus, the supporting means 13, and the hand supported thereby, can be moved back to the starting position. As shown in FIG. 6, a movement detection signal can be generated upon movement of the supporting 13 and connecting 14 parts. A ball 20 or other mechanism known in the art for detecting movement relative to a planar surface provides a signal that can be transmitted through a wired or wireless signal path (not shown) to represent movement of the supporting and connecting parts.

Figure 5:
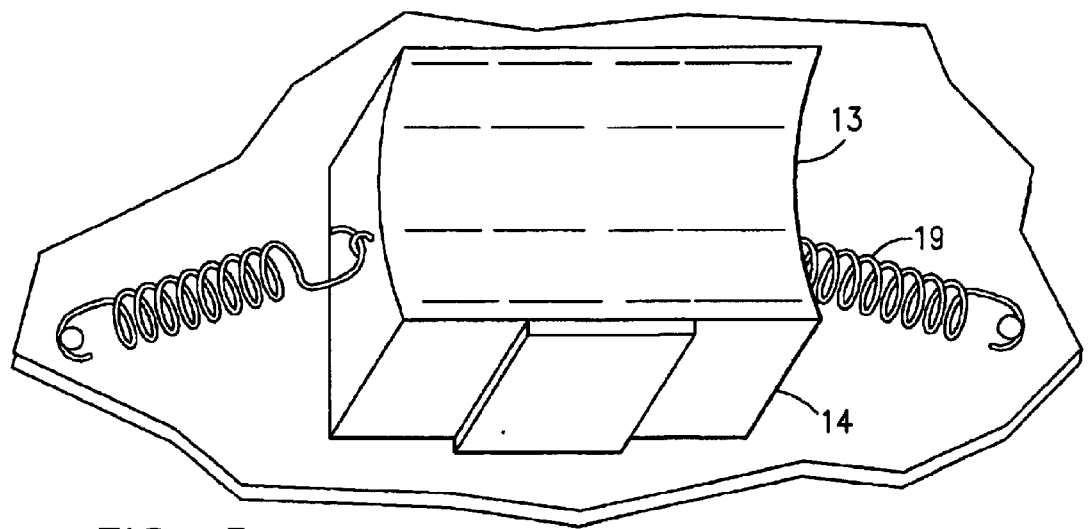
FIG. 5 shows a detailed view of a supporting part for the hand, wrist, or arm of the user of the keyboard.

Further, the connecting parts 14 of the supporting means can be provided with a curvature, shown in FIG. 5, such that each connecting part can automatically move back to an initial position. This curvature can be, for instance, a parabolic curvature.

In addition, each supporting part 13 of the supporting means can be designed in different ways, for instance in the form of a glove or a part thereof.

Further, a supporting part 13 and an associated connecting part 14 and 15, respectively, can be discrete parts or be manufactured integrally.

Further, the keyboard 1 can be provided, for instance, with a third keyboard portion on which special keys are arranged, such as function keys, a shift, enter, control, alt, delete key, a numerical keyboard portion and the like. In addition, the keyboard 1 can be provided with a keyboard support to impart stability to the keyboard.

The keys 9 can be designed in different ways, for instance as keys to be pressed mechanically and/or as touch-control keys.

What is claimed is:

1. A keyboard, comprising a left and a right keyboard portion which are intended to be operated on a respective operation side by a left hand and right hand, respectively, characterized in that the operation side (7, 8) of each keyboard portion (5, 6) includes an angle in the range of about 60–150 degrees with a horizontal plane, the keyboard (1) being provided with left and right supporting means (13, 14; 15) for supporting at least the left and right hand and/or forearm, respectively, during operation of the respective keyboard portion (5, 6), the supporting means (13, 14; 15) being arranged to allow during use a substantially horizontal displacement of the hands and/or forearms supported thereon relative to the respective keyboard portion (5, 6) which in turn is provided with a verification side (17), facing away from the corresponding operation side (7, 8), with each said keyboard portion (5, 6) being so designed that operation of the keyboard portion is visually verifiable on the verification side (17).

2. A keyboard according to claim 1, characterized in that the left and right supporting means are provided with a left and right supporting part (13), respectively, for supporting at least a respective hand, the left and right supporting means being arranged such that the respective supporting part (13) is movable substantially in horizontal direction.

3. A keyboard according to claim 2, characterized in that the left and right supporting means are provided with a respective connecting part (14, 15) to couple the respective supporting part (13) to the keyboard (1).

4. A keyboard according to claim 3, characterized in that each connecting part (14; 15) is at least pivotably, slidably and/or telescopically movably connected to the keyboard.

5. A keyboard according to claim 3, characterized in that each supporting part (13) is suspended from the keyboard by means of an associated connecting part (15).

6. A keyboard according to claim 5, characterized in that the left and right supporting means (13, 15) are designed in the form of a sling.

7. A keyboard according to any one of claims 3–6, characterized in that the supporting means are each provided with spring means which are arranged to exert a spring force on the respective connecting part (14; 15) after the connecting part has been displaced relative to the keyboard (1) from a starting position, which spring force is directed against that displacement.

8. A keyboard according to claim 1, characterized in that the keyboard (1) is provided with means for generating an electronic signal which depends on a movement and/or a position of at least one supporting part (13) relative to the keyboard (1).

9. A keyboard according to claim 1, characterized in that said operation sides (7, 8) extend substantially in vertical direction.

10. A keyboard according to claim 9, characterized in that said operation sides (7, 8) substantially face away from each other.

11. A keyboard according to claim 1, characterized in that the keyboard (1) is designed such that the direction in which each of said operation sides (7, 8) extends, is adjustable.

12. A keyboard according to claim 11, characterized in that the keyboard (1) is at least partly made of flexible material, such that the keyboard (1) can be bent to change the direction in which each of the operation sides (7, 8) extends.

13. A keyboard according to claim 1, characterized in that the left and right keyboard portion (5, 6) are detachably connected to each other.

14. A keyboard according to claim 1, characterized in that the left and right keyboard portion (5, 6) are pivotally connected to each other.

15. A keyboard according to claim 1, characterized in that each keyboard portion (5, 6) is of at least partly transparent design.

16. A keyboard according to claim 1, characterized in that the keyboard (1) is provided with mirrors which are positioned such that a user, from a user position, can see the operation sides (7, 8) of the keyboard portions (5, 6) via the mirrors.

17. A keyboard according to any one of claim 14 or 16, characterized in that each keyboard portion (5, 6) is provided with pressable keys, which keys extend from the respective operation side (7, 8) to the respective verification side, the keys being provided with corresponding key symbols on the verification side.

18. A keyboard according to claim 1, characterized in that the keyboard portions (5, 6) are each of substantially cylinder segment-shaped design.

19. A keyboard according to claim 1 characterized in that the keyboard (1) is of spherical design, such that each operation side (7, 8) forms a segment of a sphere.

20. A keyboard according to claim 1, characterized in that the keyboard (1) is provided with a picture, facing a user during use, on which a layout of the keys (9) is visible.

\* \* \* \* \*